UNITED STATES PATENT OFFICE.

ERNEST WILLIAM COOKE, OF NEW YORK, N. Y., ASSIGNOR, BY MESNE ASSIGNMENTS, TO THE COKEL COMPANY, A CORPORATION OF NEW JERSEY.

DEHYDRATED POTATOES AND PROCESS OF PREPARING THE SAME.

1,025,373.     Specification of Letters Patent.     Patented May 7, 1912.

No Drawing.     Application filed January 11, 1905. Serial No. 240,666.

*To all whom it may concern:*

Be it known that I, ERNEST W. COOKE, a citizen of the United States, residing at New York, in the county of New York and State of New York, have invented certain new and useful Improvements in Dehydrated Potatoes and the Processes of Preparing the Same; and I do declare the following to be a full, clear, and exact description of the invention, such as will enable others skilled in the art to which it appertains to make and use the same.

My invention relates to a novel food product, namely, dehydrated slightly cooked potatoes of substantially unchanged structure, and to the process whereby the same are prepared.

The result of the process, which will be hereinafter described in detail, is, as far as I am aware, an entirely novel food-product, which will be of the greatest utility, since the dehydrated potatoes, which are of course very much reduced in bulk and weight, since water constitutes a large element of potatoes, can be kept indefinitely in suitable packages, simply require the addition of water to return them to their original hydrated condition, and cannot then be distinguished in any way from the original material subjected to the dehydrating treatment.

While I usually comminute more or less to facilitate the operation, the comminuted product of the present process is substantially the same as a fresh vegetable in a similar state of comminution.

The size of the particles or pieces into which the potatoes are divided as above stated may vary widely, but it is convenient and gives good results to divide them into pieces having at least one dimension of not more than about one-half an inch, whether they are to be afterward shredded or otherwise finely divided before being dehydrated, or are to be dehydrated without being further divided.

The essential feature of my process, by which this novel and useful result is obtained is the maintenance during the operation in an intact condition of the cell walls of substantially all the cells which inclose the starch granules, whereby the latter are prevented from coalescing. The maintenance of the intact condition of the cell walls of the majority of the cells of the potato is substantially necessary for the present process. If, on the other hand, the cell walls are crushed or injured in the preliminary treatment, the addition of water to the dried product will produce a mucilaginous starchy mass, which is entirely inedible.

The process consists of the following steps: The potatoes are first steamed or boiled in the usual way, either with or without their skins, and if the skins have not been previously removed the potatoes are then peeled. Since the object of the subsequently described operations is to produce a product having the majority of the cells unruptured, the cooking obviously should not be carried too far. The next step consists in dividing the potatoes into suitably sized particles, in an atmosphere of from 30° to 100° F. This operation, which of course may be performed by hand is however, preferably performed by suitable apparatus, which constitutes no part of my present invention, any apparatus being adapted for the present purposes which will comminute the potato to the desired degree without producing any substantial disintegration of the resulting particles, and where such apparatus is used, I direct a current of air, of a temperature between the limits mentioned, through the potatoes, while they are being divided.

The resulting material may be shredded, or otherwise more finely divided, but it is essential that in this operation the cell walls which inclose the starch cells or granules be not ruptured, as would be the case if the potatoes were divided by a grinding or crushing operation. The shredding may be performed by forcing the potatoes through a screen in such a manner as not to pulp or otherwise destroy the cellular structure and the resulting material is then dehydrated by being subjected to the action of dry, hot air at a temperature of from 100° to 180° F. The moist material exposed to the hot air does not reach this temperature and does not reach a temperature at which any substantial injurious change of the potato will result. While this shredding operation divides the potatoes into small particles, yet the latter are still relatively large compared with the cells inclosing the starch granules, and I have discovered that said cells, or at any rate the vastly greater number of the said cells, are not ruptured by shredding where proper methods of comminution are adopted. It is the fact that these cells are maintained intact which enables the potatoes on remoistening to be perfectly returned to their original condition.

The stated temperature of the air employed in dehydrating is essential, for I have found that unless the temperature is maintained between the limits mentioned the desired results are not obtained.

By proper maintenance of the conditions in the described operation, a product may be obtained which is dehydrated as distinguished from desiccated; that is, while it has lost all the water which is, so to speak, mechanically present it has not lost its water of constitution. If the water of constitution be expelled, as may happen if the conditions set forth are not adhered to, the product cannot be restored to its original texture and composition by the addition of water. The addition of water to the dried material can only restore the original material where the drying operation has removed only the water mechanically present.

The dehydrated shredded potatoes obtained by this process can be kept indefinitely in sealed packages and can be prepared for the table by the simple addition of either hot or cold water, which serves to restore the potatoes to exactly their original hydrated condition, so that they cannot be distinguished from potatoes prepared in the usual way and cooked to the same degree.

Having thus described my invention, what I claim and desire to secure by Letters Patent of the United States is:

1. The process of preparing dehydrated potatoes, which consists in slightly cooking potatoes under conditions not causing rupture of the cell walls, and then, while the cooked potatoes are in a condition with the cell walls of substantially all of the vegetable cells containing the starch granules intact, dehydrating them by subjecting them to the action of dry air at a temperature insufficient to produce material changes in the composition of the potato or to remove water of constitution.

2. The process of preparing dehydrated potatoes, which consists in cooking potatoes under conditions not causing rupture of the cell walls, dividing the cooked potatoes in a current of air at a temperature of from 30° to 100° F. into suitable sized pieces or particles in such a way as to leave the cell walls of substantially all of the vegetable cells containing the starch granules intact, and dehydrating the cooked and divided potatoes by subjecting them to the action of dry air at a temperature insufficient to produce material changes in the composition of the potato or to remove water of constitution.

3. The process of preparing dehydrated potatoes, which consists in cooking potatoes under conditions not causing rupture of the cell walls, dividing the cooked potatoes while in a current of air of a temperature of from 30° to 100° F. into suitable sized pieces or particles in such a way as to leave the cell walls of substantially all of the vegetable cells containing the starch granules intact, and dehydrating the cooked and divided potatoes by subjecting them to the action of dry air of a temperature of from 100° to 180° F.

4. The process of preparing dehydrated potatoes, which consists in cooking potatoes under conditions not causing rupture of the cell walls, shredding the cooked potatoes by passing them through a screen in such a way as to leave the cell walls of substantially all of the vegetable cells containing the starch granules intact, and dehydrating the cooked and shredded potatoes by subjecting them to the action of dry air at a temperature insufficient to produce material changes in the composition of the potato or to remove water of constitution.

5. As a new article of manufacture, slightly cooked dehydrated potatoes having the cell walls of substantially all of the cells inclosing the starch granules intact and having such starch granules in an intact condition.

6. As a new article of manufacture, dehydrated finely divided potatoes having the cell walls of substantially all of the cells inclosing the starch granules intact.

In testimony whereof, I affix my signature, in presence of two witnesses.

ERNEST WILLIAM COOKE.

Witnesses:
H. H. BROCKWAY,
JOHN S. POTTER.